United States Patent [19]

Edwards

[11] 4,020,186
[45] Apr. 26, 1977

[54] METHOD FOR MANUFACTURE OF RICOTTA CHEESE

[75] Inventor: John L. Edwards, Wildwood, Ill.

[73] Assignee: Kraftco Corporation, Glenview, Ill.

[22] Filed: Dec. 16, 1974

[21] Appl. No.: 532,837

[52] U.S. Cl. .................................. 426/36; 426/39; 426/582

[51] Int. Cl.² ...................................... A23C 19/00

[58] Field of Search ............... 426/36, 39, 43, 150, 426/188, 357, 361, 491, 582

[56] References Cited

UNITED STATES PATENTS

| | | | |
|---|---|---|---|
| 2,160,159 | 5/1939 | Lundstedt et al. | 426/188 |
| 3,780,199 | 12/1973 | Carswell | 426/495 |

OTHER PUBLICATIONS

"Cheese Varieties & Descriptions," U.S.D.A. Agr. Handbook, No. 54, pp. 105–106.

F. Kosikowski, "Cheese and Fermented Milk Foods," Published by the author, Cornell University, N. Y., 1966, pp. 94–95, 109–111.

*Primary Examiner*—Raymond N. Jones
*Assistant Examiner*—C. A. Fan
*Attorney, Agent, or Firm*—Fitch, Even, Tabin & Luedeka

[57] ABSTRACT

In the method of the invention, skim milk is transferred to a setting tank. The skim milk is acidified and heated to provide a coagulum in whey. The coagulum is separated from the whey and blended with a sufficient amount of cream to provide a mixture having the desired fat level in the finished Ricotta cheese. The mixture is then comminuted to provide a Ricotta cheese product having a texture similar to that associated with Ricotta cheese produced by conventional cheesemaking techniques.

5 Claims, No Drawings

METHOD FOR MANUFACTURE OF RICOTTA CHEESE

The present invention relates generally to an improved method for the manufacture of Ricotta cheese. More particularly, the present invention relates to an improved method for making Ricotta cheese wherein the amount of fat lost during the manufacture of Ricotta cheese is substantially reduced.

Ricotta cheese is a well-known distinctive type of cheese which is manufactured by a process which includes cooking of the curd at high temperature. High temperature cooking of the curd provides Ricotta cheese with a characteristic cooked, carmel flavor, but at the same time causes loss of fat from the curd. Thus, the production of an acceptable Ricotta cheese product has heretofore resulted in excessive fat losses during the cheesemaking procedure. Ricotta cheese may be made from milk and various milk fractions and has often been manufactured from sweet whey produced in the manufacture of Swiss cheese or Cheddar cheese. In the United States, Ricotta cheese is most often made from cow's milk. Further discussion herein of methods of making Ricotta cheese is directed to the manufacture of Ricotta cheese from cow's milk which contains about 3 to 4 percent fat.

In known methods of making Ricotta cheese from cow's milk, the milk is pumped into a jacketed setting tank of a size such that a sufficient head space is present to compensate for expanded volume during heating. Depending upon the fat content desired in the Ricotta cheese product, the milk may be whole millk, partially skimmed milk, or a mixture of milk and a supplemental fat source. A usual Ricotta cheese product may contain between about 10 and about 13 weight percent fat, however it is not uncommon to have as little as 2 weight percent fat or as much as 16 weight percent fat depending upon the particular end use of the Ricotta cheese.

The milk in the setting tank is then acidulated by means of an acidulant to provide a substantially immediate titratable acidity of about 0.30 percent. As used herein the term "acidity" means equivalent lactic acid. Suitable acidulants include lactic cultures prepared by growing a lactic acid-producing microorganism in skim millk, fermented whey, concentrated acid whey, dried acid whey, acetic acid, citric acid, lactic acid, gluconic acid, and glucono delta lactone.

Sufficient acidulant is added to the whole milk to immediately produce a titratable acidity of about 0.30 percent. Thereafter, the milk is coagulated by heating the milk to a temperature of about 175° F. Heating and agitation is usually effected by direct steam injection into the milk. Salt and stabilizer are usually added during heating. The steam is turned off after curd particles appear and the milk is allowed to remain quiescent, with or without further indirect heating for a period sufficient to permit knitting of the curd on the surface of the mix. The curd may be gently pushed from the edges of the setting tank toward the center as indirect heating is continued during the knitting of the curd which usually is completed in 10 to 30 minutes. The curd is then ready for removal to suitable containers.

The cure is removed from the kettle by dipping the curd from the kettle by hand with a shallow, perforated, stainless steel scoop. The curd is then placed into perforated containers which hold about 3 pounds of curd. The filled containers of curd are then placed in a sink and cold water is circulated around the containers for about 60 minutes so as to cool the curd.

The containers are then aligned on a flat area and are covered with cheesecloth. Large quantities of crushed ice are placed over the containers to thoroughly chill the curd and provide a Ricotta cheese product.

After being stored overnight, the Ricotta cheese is ready for distribution. The Ricotta cheese may be distributed in bulk or may be emptied into mechanical fillers which repack the cheese into consumer size packages.

Known methods for the manufacture of Ricotta cheese from whole cow's milk or from milk supplemented with additional fat result in a substantial loss of fat during the manufacturing process. It would be desirable to provide a method for the manufacture of Ricotta cheese wherein the loss of fat during the manufacturing process is substantially reduced.

Accordingly, it is the principal object of the present invention to provide an improved method for the manufacture of Ricotta cheese. Another object of the present invention is to provide a method for the manufacture of Ricotta cheese wherein loss of fat is substantially reduced. It is a further object of the present invention to provide a method for the manufacture of Ricotta cheese with reduced loss of fat which is suitable for both hot pack and cold pack manufacturing methods.

Generally, in accordance with various features of the present invention, skim milk is transferred to a setting tank. The skim milk is acidified with an acidulant and heated to provide a coagulum in whey. The coagulum is separated from the whey. Thereafter, the coagulum is blended with a sufficient amount of cream to provide a mixture having the desired fat level in the finished Ricotta cheese. The mixture is then subjected to sufficient mechanical shearing forces to reduce the particle size of the coagulum such that the product has a texture similar to the texture associated with Ricotta cheese.

The reduction of the particle size of the coagulum, referred to herein as "comminuting", may be carried out in diverse manners, as more fully discussed hereinafter. While these procedures are similar to homogenizing, they differ from homogenizing in that they are less severe and are for the purpose of reducing the solid curd particle size rather than for creating an emulsion.

Any one of a number of acidulants such as fermented whey, concentrated acid whey, dried acid whey, fermented lactic cultures, acetic acid, citric acid, lactic acid, gluconic acid, hydrochloric acid, and glucono delta lactone may be used. A preferred acidulant is acid whey obtained from cheesemaking operations such as the manufacture of cottage cheese and cream cheese. By "acid whey" is meant a whey having a pH of from about 4 to about 5 when the whey is present in an aqueous dispersion at a level of 6 percent whey solids. Acid whey is generally obtained from cottage cheese and cream cheese make procedures.

A sufficient amount of acidulant is added to the skim milk to establish a pH in the range of from about 5.6 to about 6.4. Thereafter, the acidified skim milk is heated and agitated by direct steam injection to a temperature in the range of from about 170° to about 190° F. over a period of from about 15 to about 90 minutes during which time a coagulum forms. After the coagulum is formed the direct steam injection is terminated and the coagulum is allowed to knit while being maintained at an elevated temperature resulting in the formation of a curd which coalesces and separates partially from the whey. The mixture may be indirectly heated during the time of the knitting of the curd.

The whey is then separated from the curd. The whey can be decanted or drained from the curd while the mixture of curd and whey is in the make tank. However, it is generally preferred to effect separation of the curd from the whey by a suitable mechanical separator such as a vibrating screen or mesh screen conveyor. A suitable vibrating screen is manufactured by Southwestern Engineering Company and is known by the trade name SWECO screen.

The screen mesh size should be from about 50 to about 400 mesh, Tyler Standard Sieve Scale. Prior to effecting separation of the whey from the mixture of curd and whey using a vibrating screen, it is preferred to agitate the mixture in the setting tank to disperse the curd in the whey.

In accordance with the disclosed process the curd separated from the whey, which has a very low fat content as a result of being obtained from skim milk without any additional fat source, is combined with sufficient pasteurized cream to provide the desired level of fat in the finished Ricotta cheese product. In this connection, cream is added to the cheese curd at a level sufficient to establish from about 2 to about 16 percent fat in the finished Ricotta cheese product. Salt and stabilizer may be added to the product by first mixing the salt and stabilizer with the cream or by adding the salt and stabilizer to the mixture of cream and curd. The latter is the generally preferred procedure.

After the pasteurized cream is added to the Ricotta cheese curd the mixture of cream and curd is blended until a homogeneous mix is obtained. The homogeneous mix of skim milk curd and pasteurized cream is then comminuted with sufficient mechanical shearing forces to reduce the curd particle size and to provide a finished Ricotta cheese product. The Ricotta cheese can be packaged while hot or may be subjected to heat exchange to cool the Ricotta cheese product and can be packaged while cold.

In some instances the blended homogeneous mixture of cream and skim milk curd may not require comminuting depending upon the character and particle size of the curd obtained after separation of the whey. The purpose of comminuting the mixture of curd and cream is to reduce the gaininess of the Ricotta cheese product, and if an acceptable nongrainy blend of curd and cream is obtained, the comminuting step may be omitted. In most instances, however, comminuting of the mixture of curd and cream is required to obtain a product having the characteristic texture of Ricotta cheese.

Comminution of the mixture of pasteurized cream and skim milk curd can be effectd in different ways. A preferred method of comminuting the mixture of curd and cream is by passing the mixture through a valve suitable for establishing back pressure in either a single pass or by recirculating in a closed loop. Pumping of the curd through the valve is effected by means of any type of positive displacement pump. Suitable valves for establishing a desired back pressure are gate valves, globe valves, flat seat manual compression valves, and micrometer-type compression valves. In general, any type of valve which can be adjusted to establish the desired back pressure can be used. A back pressure in the range of from about 5 psig to about 100 psig, preferably from about 20 psig to about 40 psig is suitable for comminuting the mixture.

The following examples further illustrate various features of the present invention but are intended to in no way limit the scope of the invention which is defined in the appended claims.

EXAMPLE I 10,000 pounds of skim milk having an acidity of 0.15 percent are introduced into a jacketed kettle. 190 pounds of cottage cheese whey powder having an acidity of 8.2 percent are added to provide a mix having an acidity of 0.30 percent. As used herein, the term "percent acidity" refers to acidity expressed as percent equivalent lactic acid.

The mix is heated by direct steam injection into the mix to a temperature of 175° F over a period of about 40 minutes. When a coagulum is formed, the steam is turned off and the mix is allowed to remain quiescent for a period of about 20 minutes. During this time, the coagulum coalesces and knits to form curd particles in whey. Thereafter, the curd and whey are agitated to provide a uniform mixture of curd particles in whey. The mixture is pumped by a positive displacement pump to a vibratory screen separator having a 200 mesh screen. The curd residence time on the vibratory screen is adjusted to provide a curd which contains 24 percent by weight total solids.

The curd is then pumped by a positive displacement pump to a jacketed kettle provided with a scraping agitator. Cream, containing 40 percent milk fat and 45.3 percent total solids and salt are added to the curd in the kettle. Salt is added in an amount sufficient to provide 0.2 percent salt in the finished product. Prior to use, the cream is pasteurized at 185° F for 10 minutes and homogenized in a two stage homogenized maintained at 1500 psig in the first stage and at 500 psig in the second stage. The cream is held at 150° F until added to the curd. The curd and cream are blended in amounts sufficient to provide a Ricotta cheese product having 11 percent fat and 29.9 percent total solids. During the blending step, steam is maintained in the jacket of the blending kettle so as to maintain the temperature of the mixture during the blending at about 160° F.

The mixture of curd and cream is then pumped by a positive displacement pump through a line provided with a flat seat manual compression valve. The valve is adjusted to maintain a back pressure of 25 psig so as to comminute the curd particles and provide a cheese product having the characteristic texture and flavor of Ricotta cheese. The Ricotta cheese is then packaged while hot and is cooled in the package.

EXAMPLE II

A further batch of Ricotta cheese is prepared in accordance with the procedure of Example I. Prior to packaging, the Ricotta cheese is pumped through a heat exchanger so as to cool the Ricotta cheese to a temperature of 50° F.

What is claimed is:
1. A method for the manufacture of Ricotta cheese which reduces the amounts of fat lost in the process, comprising introducing skim milk into a setting tank, adding an acidulant to the skim milk at a level sufficient to establish a pH of from about 5.6 to about 6.4, heating the acidulated skim milk to a temperature of from about 170° to about 190° F. to set the skim milk to provide a mixture of curd and whey, separating the curd from the whey, adding cream to said curd at a level sufficient to provide a finished Ricotta cheese product containing from about 2.0 percent to about 16 percent by weight fat and comminuting the mixture of curd and cream to reduce the curd particle size.

2. A method in accordance with claim 1 wherein said acidulant is selected from the group consisting of fermented whey, concentrated acid whey, dried acid whey, fermented lactic cultures, acetic acid, citric acid, lactic acid, gluconic acid, hydrochloric acid, and glucono delta lactone and is added in an amount sufficient to provide an acidity of about 0.30 percent.

3. A method in accordance with claim 1 wherein said acidified skim milk is heated to a temperature in the range of from about 170° to about 190° F. over a period of from about 15 to about 90 minutes.

4. A method in accordance with claim 1 wherein said curd is separated from said whey by means of a vibrating screen.

5. A method in accordance with claim 4 wherein said vibrating screen has a mesh size of from about 50 to about 400 mesh.

* * * * *